United States Patent
Kempe

(10) Patent No.: US 9,857,175 B2
(45) Date of Patent: Jan. 2, 2018

(54) MICRO-GYROSCOPE FOR DETECTING MOTIONS

(71) Applicant: Hanking Electronics, Ltd., Canton, OH (US)

(72) Inventor: Volker Kempe, Lieboch (AT)

(73) Assignee: Hanking Electronics, Ltd., Canton, OH (US)

(*) Notice: Subject to any disclaimer, the term of this patent is extended or adjusted under 35 U.S.C. 154(b) by 0 days.

(21) Appl. No.: 14/882,115

(22) Filed: Oct. 13, 2015

(65) Prior Publication Data

US 2016/0178374 A1    Jun. 23, 2016

Related U.S. Application Data

(63) Continuation of application No. 13/641,663, filed as application No. PCT/EP2011/056267 on Apr. 19, 2011, now Pat. No. 9,157,740.

(30) Foreign Application Priority Data

Apr. 20, 2010   (DE) .................. 10 2010 028 005

(51) Int. Cl.
*G01C 19/5719*   (2012.01)
*G01C 19/5656*   (2012.01)
(Continued)

(52) U.S. Cl.
CPC ......... *G01C 19/5747* (2013.01); *G01C 19/56* (2013.01); *G01C 19/5642* (2013.01); *G01C 19/5656* (2013.01); *G01C 19/5719* (2013.01)

(58) Field of Classification Search
CPC ............ G01C 19/5712; G01C 19/5747; G01C 19/574; G01C 19/56; G01C 19/5719;
(Continued)

(56) References Cited

U.S. PATENT DOCUMENTS 5,195,371 A   3/1993   Greiff
6,539,804 B1  4/2003   Iwata
(Continued)

FOREIGN PATENT DOCUMENTS

DE    102007054505 A1    5/2009
DE    102008002748 A1    12/2009
(Continued)

OTHER PUBLICATIONS

English Machine translation for DE 102007054505.*
(Continued)

*Primary Examiner* — Peter Macchiarolo
*Assistant Examiner* — Anthony W Megna Fuentes
(74) *Attorney, Agent, or Firm* — Hartman Global IP Law; Gary M. Hartman; Domenica N. S. Hartman

(57) ABSTRACT

The invention relates to a micro-gyroscope for detecting motions relative to an X and/or Y and Z axis, particularly as a 3D, 5D, or 6D sensor. Sample masses are disposed uniformly about an anchor and can be driven radially relative to the central anchor. Anchor springs are disposed to attach the sample masses to a substrate, and these sample masses can be deflected both radially within and out of the X-Y plane. A sensor mass is disposed on one-of the sample masses by means of sensor springs, and the sensor springs allow deflection of the sensor mass within the plane of the sample mass, and orthogonal to the radial drive direction of the sample masses. Drive elements oscillate these sample masses in the X-Y plane, and sensor elements captures the defection of the sample masses due to the Coriolis forces generated when the substrate is rotated.

19 Claims, 2 Drawing Sheets

(51) Int. Cl.
    *G01C 19/5642*     (2012.01)
    *G01C 19/5747*     (2012.01)
    *G01C 19/56*     (2012.01)

(58) Field of Classification Search
    CPC .................. G01C 19/42; G01C 19/5621;
        G01C 19/5656; G01C 19/5684; G01P
        15/125; G01P 15/18; G01P 2015/0814;
        G01P 15/08; G01P 15/0802; G01P 9/02;
        G01P 15/14; G01P 2015/0831; G01P
        15/097; G01P 2015/0871; G01P 15/0888;
        G01P 15/00; G01P 15/02; G01P 15/123;
        G01P 1/003; G01P 2015/0817; G01P
        2015/082; G01P 2015/0828; G01P
        2015/0837; G01P 2015/0848; G01P
        2015/0851; G01P 2015/0862; G01P
        2015/0874; G01P 2015/088; G01P 3/44;
        G01P 9/04; B81B 2201/0242
    USPC .............. 73/504.01–504.18, 514.24, 514.32,
        73/514.38
    See application file for complete search history.

(56) References Cited

U.S. PATENT DOCUMENTS

| | | |
|---|---|---|
| 2005/0024527 A1 | 2/2005 | Chiou |
| 2007/0131030 A1 | 6/2007 | Jeong et al. |
| 2007/0214883 A1 | 9/2007 | Durante et al. |
| 2010/0236327 A1 | 9/2010 | Mao |

FOREIGN PATENT DOCUMENTS

| | | |
|---|---|---|
| DE | 102009001244 A1 | 9/2010 |
| EP | 1793202 A2 | 6/2007 |
| JP | H05-133976 | 5/1993 |
| JP | 2007155489 | 6/2007 |
| JP | 2007333643 A | 12/2007 |
| WO | 2009062786 A1 | 5/2009 |
| WO | 2009156485 A1 | 12/2009 |

OTHER PUBLICATIONS

Ofice Action dated Aug. 19, 2014, in Japanese Patent Application No. 2013-505465 (3pgs).
Office Action dated Nov. 4, 2014, in Chinese Patent Application No. 201180024978.6 (18pgs).
International Search Report for International Patent Application No. PCT/EP2011/056267 (2pgs).
Office Action dated Jun. 2, 2015, in Chinese Patent Application No. 2015052801381010 (14pgs).
Written Opinion dated Oct. 20, 2012, in International PCT Patent Application No. PCT/EP2011/056267 (5pgs).
Notice of Grant dated Feb. 12, 2016, in European Patent Application No. 11715917.8-1557 (26pgs).
Notice of Grant dated Apr. 13, 2016, and English translation of the claims, in Chinese Patent Application No. 201180024978.6 (8pgs).
Notice of Grant dated Jun. 23, 2016, in European Patent Application No. 11715917.8 (2pgs).
Office Action dated Nov. 10, 2015, in Chinese Patent Application No. 201180024978.6 (7pgs).
Response as filed Jan. 11, 2016, english translation of the claims and the description, in Chinese Patent Application No. 201180024978.6 (31pgs).

\* cited by examiner

MICRO-GYROSCOPE FOR DETECTING MOTIONS

CROSS REFERENCE TO RELATED APPLICATIONS

This application is a continuation of previously filed and copending application Ser. No. 13/641,663, filed Oct. 16, 2012, which is the National Phase Application under 35 U.S.C. §371 of International Application No. PCT/EP2011/056267, filed Apr. 19, 2011, which application claims priority to German Application No. 102010028005.4, filed Apr. 20, 2010, all applications of which, having the same title and listing the same inventors, are hereby incorporated herein by reference in their entireties.

BACKGROUND

A. Technical Field

The present invention relates to a micro-gyroscope for detecting motions relative to an X and/or a Y and a Z axis, particularly as a 3D, SD, or 6D sensor, having a substrate, having a plurality of oscillating sample masses, having anchors and anchor springs disposed between the anchor and drive mass for attaching the oscillating sample masses to the substrate, having drive elements for oscillating the sample masses in the X-Y plane, in order to generate Coriolis forces during a rotary motion of the substrate and to capture deflections of the sample masses due to the Coriolis forces generated from the X or Y rotation rates using sensor elements, particularly electrodes disposed below the sample masses (1).

B. Background of the Invention

Micro-electromechanical (MEMS) gyroscopes are generally used for detecting a rotary motion about an axis in an X-Y-Z coordinate system. In order to be able to determine the rotary motion of the system about each of the three axes, therefore, three such micro-gyroscopes are required. The controls and analysis of the data are cost-intensive and required a great deal of effort.

In order to be able to create a three-dimensional gyroscope, in which rotations in all three axes can be determined, D. Wood proposed, in the article "A monolithic silicone gyroscope capable of sensing about three axes simultaneously," 1996, a gyroscope having oscillating masses disposed in an annular manner about a central anchor and capturing both tipping and rotary motions due to Coriolis forces. The disadvantage hereby is that the production of such a sensor, as well as the driving of the moving masses, is difficult or impossible to implement. The embodiments according to D. Wood et al. therefore remain of a theoretical nature.

A 3D gyroscope is also proposed in the article, "Design and dynamics of an innovative micro-gyroscope against coupling effects" by Nan-Chyuan Tsai. The disadvantage hereby is that an inner plate and an outer ring are present, as well as four moving masses. The spring constructions required, with low rigidity in two orthogonal directions of rotation, are sensitive to tolerances and difficult to implement.

Both proposed solution approaches are not suitable for simultaneously capturing accelerations along two or three orthogonal axes.

SUMMARY OF THE INVENTION

The object of the present invention is to provide a 3D micro-gyrosensor that can be produced at a reasonable cost and having high capture accuracy, avoiding the unsuitable features indicated above, and that can be optionally designed so that two or three additional acceleration components can be captured simultaneously.

The object is achieved by a micro-gyroscope having the features of claim 1.

The micro-gyroscope according to the invention serves particularly for determining rotational motions about an X and/or Y and Z axis, particularly as a 3D sensor, but also as a 5D or 6D sensor additionally capturing accelerations in the X and/or Y and/or Z direction. The micro-gyroscope comprises a substrate and a plurality of oscillation sample masses, wherein the oscillating sample masses are attached to the substrate by anchors and anchor springs disposed between the anchors and sample masses. At least individual pairs, preferably all of the sample masses are, with the use of the drive elements, excited to oscillate opposed each other, that is, radially in the X-Y plane, in order to be subjected to Coriolis forces when the substrate rotates. Sensor elements, particularly electrodes disposed below the sample masses, detect deflections of the sample masses due to the Coriolis forces that arise from X and/or Y rotational rates and optionally from Z accelerations.

According to the invention, the sample masses are disposed uniformly about a central anchor and can be driven radially relative to the central anchor. The anchor springs are designed such that the sample masses can be deflected both radially to the central anchor in the X-Y plane and out of the X-Y plane. A sensor mass is disposed on one, particularly on each of the sample masses, by means of sensor springs. The sensor springs allow deflection of the sensor mass within the plane of the sample masses, or the X-Y plane, and orthogonally to the radial drive direction of the sample masses.

Two sample masses on opposed sides form a sample mass pair. A sample mass pair can tip about the tip axis running perpendicular in X or Y to the pair axis, due to the torsional springs mounted on the central anchor. Each sample mass can also deflect in the vertical direction due to the appropriately dimensioned elasticity of the anchor springs between the sample mass and the central suspension, and between the sample mass and the outer anchor.

The micro-gyroscope according to the invention has the advantage that it is very simple in construction, and therefore can be produced and operated with a high level of precision. The sample masses are driven to oscillate in the radial direction. The deflections of the sample masses generated due to Coriolis forces are particularly simple to analyze. The combined tipping deflection motion of a sample mass pair due to an X rotational rate or a Y rotational rate occurs only in the Y direction or X direction respectively. Accordingly, the sample masses disposed on the X axis are alternately shifted out of the X-Y plane with a Y rotational rate, and, analogously, the sample masses disposed on the Y axis are also alternately shifted out of the X-Y plane when an X rotational rate occurs. If acceleration occurs in the Z direction, the sample masses move out of the plane synchronously. Opposed and synchronous deflections can be separated from each other by differential and summation measurements of the deflections. Sensor elements disposed between the substrate and the sample masses detect the change in distance of the sample masses relative to the substrate, and thereby allow the derivation of the X or Y rotational rate and the Z acceleration.

If a Z rotational rate occurs, Coriolis forces anse m each of the sample masses and cause the sensor elements within a sample mass to deflect perpendicular to the radial drive motion. Said deflections are opposed within a sample mass pair. If an acceleration occurs perpendicular to the axis of a sample mass pair, the two embedded sensor elements are deflected in the same direction. Differential and summation measurements of said deflections can be used to determine both the Z rotational rate and the acceleration components perpendicular to the sample mass pair axis. It is thereby advantageously to determine the rotational rate by means of summation of the deflections of all sensor elements in the clockwise or counterclockwise direction, and to determine the accelerations by means of the difference of the deflections in the clockwise or counterclockwise direction within a sample mass pair.

In a particularly advantageous embodiment of the micro-gyroscope, four sample masses are disposed uniformly about the circumference of the central anchor. A symmetrical construction of the micro-gyroscope and correspondingly simple analysis of the rotational rates is thus made possible. The symmetry further provides a balance of forces, so that no forces act on the micro-gyroscope due to the drive motions of the opposed oscillating sample masses.

If an elastic gimbal mount is disposed between the central anchor and the springs of the sample masses, then the deflection of the sample masses from the X-Y direction can be enabled very simply and reliably. If corresponding sample masses are deflected only about the X axis, substantially no effect on the sample masses that could be deflected about the Y axis can be determined due to the gimbal mount. Precise separation of the sample masses can thus be achieved, depending on the expected deflection motion. The gimbal mount is a simple component to produce and substantially improves the precision of the micro-gyroscope.

In a particularly advantageous embodiment of the gimbal mount, it consists of two rings connected to each other by means of offset torsional springs. The torsional springs here are offset 90° to each other, so that they respectively match the drive direction of two of the oscillating sample masses. Precise separation of the deflection motions is thus achieved. Simple torsional springs can be used here. In order to obtain a particularly stable embodiment and to allow motion only in the intended direction, it is advantageous if each of the torsional springs is divided in two, wherein, in each case, two preferably parallel or diverging or converging spring bars are used.

If the sample masses and/or the sensor masses are implemented in the form of a frame, then a particularly compact construction is possible. If the sample masses are implemented in the form of a frame, it is possible to dispose the drive elements within, that is, enclosed by the sample mass. In the case of the sensor masses, the frame-type construction can allow the sensor elements to be compactly located within the sensor masses. The sensor elements, which can be made of electrodes, are located on the substrate and on the sensor mass. A motion of the sensor masses within the X-Y plane or the sample mass plane due to Z rotational rate causes a change in the distance between the electrodes fixed to the substrate and the electrodes located on the sensor mass, whereby an electrical signal is generated allowing the Z rotational rate to be derived. For a frame construction of the sample masses, in a similar manner as for the sensor masses, fixed electrodes are mounted on the substrate and electrodes are disposed on the sample masses. The sample masses are oscillated by applying an AC voltage to the electrodes. The frame construction thereby allows very compact arrangement of the electrodes, particularly without substantially increasing the outer dimensions of the micro-gyroscope beyond the sample masses.

In order to achieve a particularly compact construction of the microgyroscope, it is advantageous if the sensor mass is disposed within the frame of a sample mass. Because the sensor masses m said embodiment are also within the outer dimensions of the sample masses, the micro-gyroscope can be made very small.

In order to allow uniform oscillation of the sample masses, it is particularly advantageous if the sample masses are attached to each other by means of synchronization springs. The synchronization springs thereby regulate any slight asynchronicities that may occur when radially driving the sample masses to oscillate. Adjacent sample masses are continuously uniformly oscillated due to the synchronization springs.

In order to capture a Z rotational rate, the sensor masses have sensor elements. The sensor elements thereby react to Z rotational rates, which in turn generate Coriolis forces that cause the sensor elements to be deflected orthogonally to the drive direction of the sample masses. This motion is substantially nearly tangential to the central anchor.

The sample masses are preferably associated with sensor elements for capturing the individual deflection in the vertical Z direction. The sample masses can thereby be used both for determining rotational rates and for detecting accelerations in the Z direction, because they can be analyzed individually.

In a preferred embodiment, the sensor elements for detecting the Z deflection of a sample mass are formed by the capacitance of a sample mass and an electrode mounted beneath the sample mass on the substrate. The change in distance between the two electrodes causes a proportional change in capacitance.

If two sensor elements for detecting the Z deflection of two opposed sample masses are combined to form a differential sensor for detecting the rotation of the substrate about the axis perpendicular to said pair of sample masses in the X-Y plane, then the individual measurement results can be used for determining the rotational rate.

In a particularly advantageous embodiment of the invention, the drive elements of the oscillating sample masses are electrodes, particularly fork electrodes. In order to achieve reliable driving, a plurality of forks are disposed. In a particular embodiment of the invention, the use of several hundred, particularly about two hundred fork electrodes per sample mass has been found to be particularly advantageous.

In order to avoid the so-called quad-bias effect, it is advantageous if the sensor elements for detecting the deflection of the sample masses or sensor masses perpendicular to the radius are disposed in a detection box having shielding electrodes for counter-electrodes fixed to the substrate, thus eliminating the effect of varying stray capacitances due to radial motion. The detection box thereby provides shielding, so that erroneous signals due to unintended contact between the sensor element and other components can be prevented.

If the sample masses can be deflected in the vertical direction, and if at least two sample masses can be deflected in the same Z direction along the vertical Z axis, then an acceleration of the sensor in the Z direction can be determined in a simple manner.

A particularly advantageous embodiment of the present invention, but not the only potential embodiment, has four identical frames disposed in four quarters of a square. In order to better utilize the available area of the micro-gyroscope, it is advantageous if the axes of symmetry of the frames, which are the rate-sensitive axes in the plane, are rotated 45° relative to the X and Y axis of the substrate coordinate system. If strong separation of the rate signals along the X and Y axis of the substrate coordinate system is desired, then the entire sensor can be rotated by 45° so that the frames of the sample masses are aligned to the X and Y axis of the substrate coordinate system, and oscillate accordingly.

The frames are supported on a central gimbal mount. They comprise four springs by means of which they are connected to the substrate. Two of the four springs are disposed near the central anchor, and are connected to the gimbal mount. Two further springs of the four are disposed at the outer end of the sample masses and are connected there to a further outer anchor. The inner and outer springs allow radial deflection of the sample masses and also a motion out of the X-Y plane in order to be able to track Coriolis forces that arise.

Signals from the X rotational rates and Y rotational rates that occur are determined by changes in the capacitances of the sensor elements, which are caused by opposed deflection of the sample mass frames disposed at opposite locations of the central anchor. The sensor electrodes for the segments or sample masses deflected out of the X-Y plane are disposed beneath the frames. The sensor elements of two opposed, corresponding frames are connected to each other, in order to be able to capture the opposed corresponding frames of the sample masses.

The rotational rate signal about the Z axis is brought about by four frames embedded in the sample masses and moving together with the frames of the sample masses in the radial direction. The sensor masses additionally move at right angles to the radius of the microgyroscope if a Z rotational rate brings about Coriolis forces. Sensor and detection boxes having shielding electrodes at the ends of the boxes as end shields are used in order to eliminate the quad-bias effect that can arise due to varying boundary fields during the drive motion.

The deflection of the sensor masses for detecting a Z rotational rate is a common deflection in the clockwise or counterclockwise direction. They are measured individually. In order to eliminate the effect of accelerations of the micro-gyroscope, opposite sensor elements are analyzed accordingly. For precise detection of the Z rotational rate, it is advantageous to use a plurality of boxes per sensor mass. A quantity of approximately twelve boxes per sensor element has been found to be particularly advantageous.

The micro-gyroscope is preferably used as a 3D gyroscope for determining rotational rates about the X, Y, and/or Z axis. It can also, particularly additionally, be used for determining accelerations in the X and/or Y and/or Z direction. The sensor masses can be substantially synchronously deflected in the same circumferential direction for determining Z rotational rates. All of the sensor masses move accordingly in the same clockwise or counterclockwise direction about the central anchor. In order to determine an acceleration of the micro-gyroscope within the X-Y plane, at least two sensor masses can be deflected opposed to each other with respect to the circumferential direction. This means that two of the opposed sensor masses move together in the same direction of motion and opposed to each other in with respect to the circumferential direction of the gyroscope. A first sensor mass thus moves in the clockwise direction, while the opposite sensor mass moves in the counterclockwise direction. With respect to the direction of motion of the substrate, therefore, the corresponding sensor masses are deflected in the negative X direction for a motion in the positive X direction. The sensor elements each indicate said motion of the sensor masses accordingly.

BRIEF DESCRIPTION OF THE DRAWINGS

Further advantages of the invention are described m the following embodiment examples. Shown are.

DETAILED DESCRIPTION OF THE PREFERRED EMBODIMENTS

Figure 1:
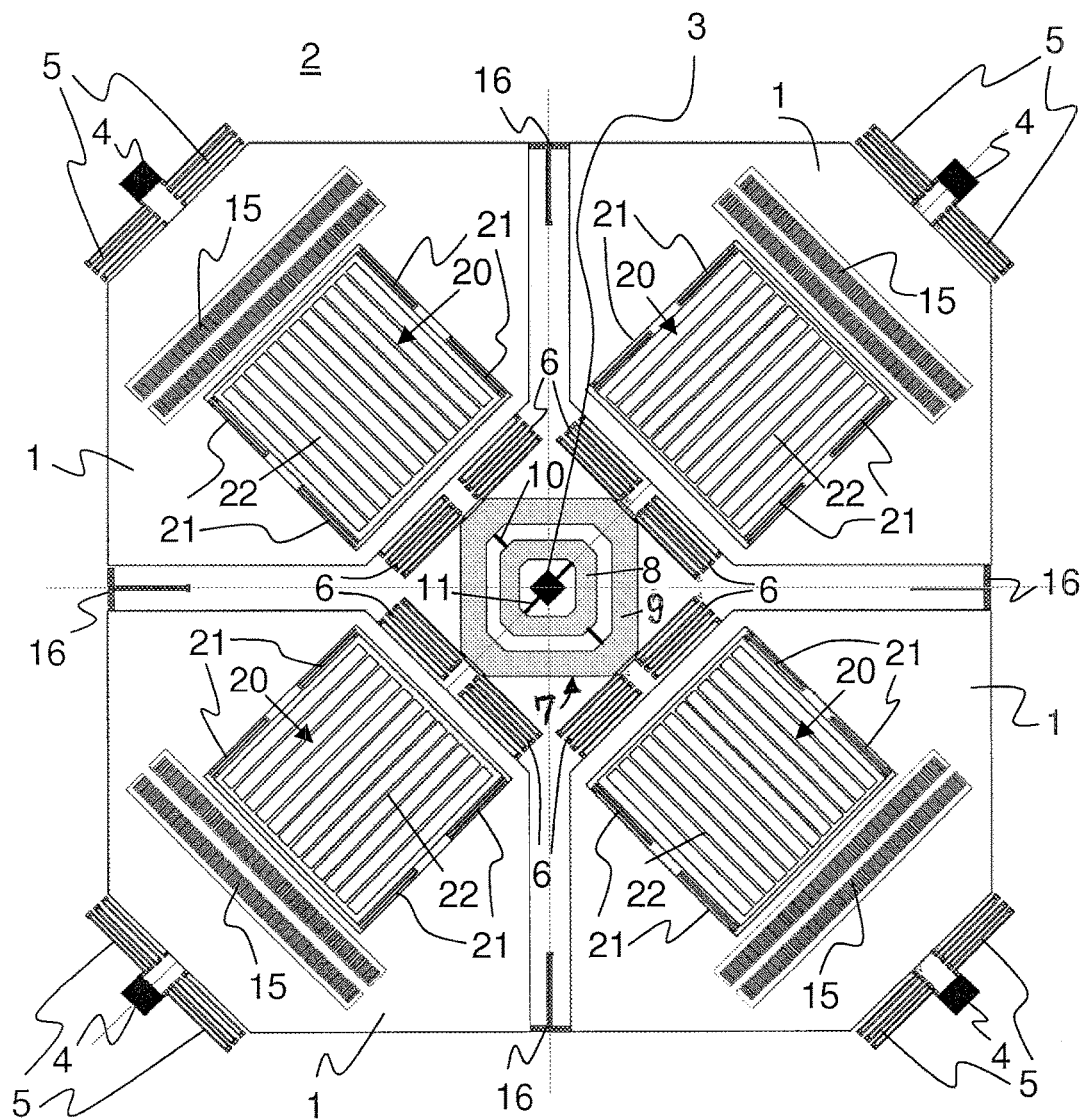
FIG. 1 a 3D, 4-frame gyroscope according to the invention.

FIG. 1 shows a 3D gyroscope comprising four frames forming sample masses 1. The sample masses 1 are disposed in a plane above a substrate 2. They are connected to the substrate 2 by means of a central anchor 3 and one outer anchor 4 per sample mass 1. The connection to the outer anchor 4 is made by two outer anchor springs 5. Two inner anchor springs 6 and a gimbal mount 7 are disposed between the sample mass 1 and the central anchor 3. The outer anchor springs 5 and the inner anchor springs 6 are designed so that they allow an oscillating motion between the outer anchor 4 and the inner central anchor 3 within the drawing plane, that is, within an X-Y plane. In addition, the anchor springs 5 and 6 are designed such that they enable deflection orthogonal to the drawing plane, in order to be able to thereby indicate an X or Y rotational rate due to the Coriolis forces that arise. In order to achieve a certain level of stability of the sample mass 1 against tipping about the axis of motion, the inner anchor springs 6 are disposed at a relatively large distance from each other on the sample mass 1. The outer anchor springs 5 are attached to the sample mass 1 relatively close to each other in the area of the outer anchor 4. A stable and easily produced attachment of the sample masses 1 to the springs 5, 6 and the anchors 3, 4 is thus achieved.

In order to prevent mutual influence of the deflections due to the X and Y rotational rates, and to allow deflection simply and without large reaction forces, a gimbal mount 7 is provided between the inner anchor springs 6 and the central anchor 3, supporting tipping motion of a sample mass pair induced by Coriolis forces. The gimbal mount 7 comprises an inner ring 8 and an outer ring 9. The inner ring 8 and outer ring 9 are connected to each other by means of two torsional springs 10. The torsional springs 10 are disposed aligned in the drive direction of two opposed sample masses 1. Two further torsional springs 11 are offset 90° therefrom, connecting the inner ring 8 to the central anchor 3. Said springs in turn are disposed aligned in the direction of the drive motion of the other two sample masses 1. Pivoting or tipping of two opposed sample masses 1 out of the X-Y plane is thus brought about without substantially affecting the two sample masses 1 disposed therebetween and driven 90° offset therefrom. The torsional springs 10, 11 can also be implemented differently than depicted here. They can, for example, each be made of two spring bars running in parallel. It is significant that they allow rotary motion about their longitudinal axes and are implemented as stable as possible in the other directions. A diverging or converging arrangement of two spring bars would therefore also be conceivable.

A stable support of the sample masses 1 is brought about by the use of two outer anchor springs 5 and two inner anchor springs 6 each. Rotation of the sample masses 1 about their drive direction or drive axis is thereby prevented. Sample masses 1 can thereby be driven very stably within the X-Y plane, and rotate about an axis perpendicular to the drive axis if a Coriolis force arises. A rotary motion about the drive axis does not occur due to said suspension of the sample mass 1.

The oscillating drive of the sample mass 1 is performed by drive elements 15 Drive elements 15 are disposed for each sample mass 1. In the present embodiment example, said elements are fork electrodes, bringing about an oscillating linear motion of the sample masses 1 by the application of an AC voltage. In order to achieve uniform drive of the sample masses 1, a plurality of said fork electrodes, preferably several hundred fork electrodes, are preferably disposed for each sample mass 1.

Also for achieving a uniform drive of the sample masses 1, synchronization springs 16 are disposed between two adjacent sample masses 1. The synchronization springs 16 bring about forces on the sample masses 1 in the case that said masses do not oscillate synchronously between the central anchor 3 and the outer anchor 4. The synchronous drive allows the use of only one system of drive electronics. The synchronous drive also ensures that no mutually counteracting forces arise on the micro-gyroscope by means of which errors could occur in the analysis.

Each of the sample masses 1 is implemented in the form of a frame. A sensor mass 20 is disposed within the frame. The sensor mass 20 is attached to the sample mass 1 by means of four springs 21. The springs 21 are attached to the sample mass 1 at the comers of the sensor mass 20. The springs 21 allow oscillating motion of the sensor mass 20 within the sample mass 1. The springs 21 largely prevent deflection out of the plane of the sample mass 1 or the Xy plane. The sensor mass 20 moves together with the sample mass 1 in the case that no Z rotational rate is applied. This means both that the sensor mass participates in the drive motion of the sample mass 1 in the X-Y plane, and that the sensor mass 20 moves out of the X-Y plane together with the sample mass 1, in the same manner as the sample mass 1, when an X or Y rotational rate occurs. For the case that a Z rotational rate is applied to the micro-gyroscope, the sensor mass 20 moves relative to the sample mass 1 in a direction orthogonal to the drive direction of the sample mass 1. Said direction is the only direction of motion that the springs 21 allow. In order to be able to detect a motion of the sensor mass 20 due to a Z rotational rate and the associated Coriolis force, the sensor mass 20 is also implemented as a frame. Sensor elements are disposed within the frame, some of which are fixedly disposed on the substrate 2 and some of which are located on the sensor mass 20. A distance between the fixed electrodes and the electrodes on the sensor mass 20 is changed by a motion of the sensor mass 20 relative to the sample mass 1 and relative to the substrate 2, and said distance can be determined by a change in capacitance.

Each sensor mass 20 comprises a plurality of sensor elements 22. The sensor elements 22 are disposed in so-called detection boxes 23. Each sensor mass 20 comprises twelve such detection boxes 23 in the example embodiment shown.

If opposed sensor masses 20 are deflected opposite a linear acceleration direction of the micro-gyroscope within the X-Y plane, then said deflection is registered by means of the sensor elements 22. In contrast, the sensor masses 20 are deflected substantially synchronously in the same circumferential direction for determining a Z rotational rate. The micro-gyroscope can thereby be used as a 5D sensor or, together with a measurement of synchronous Z deflections of the sample masses, as a 6D sensor.

Figure 2:
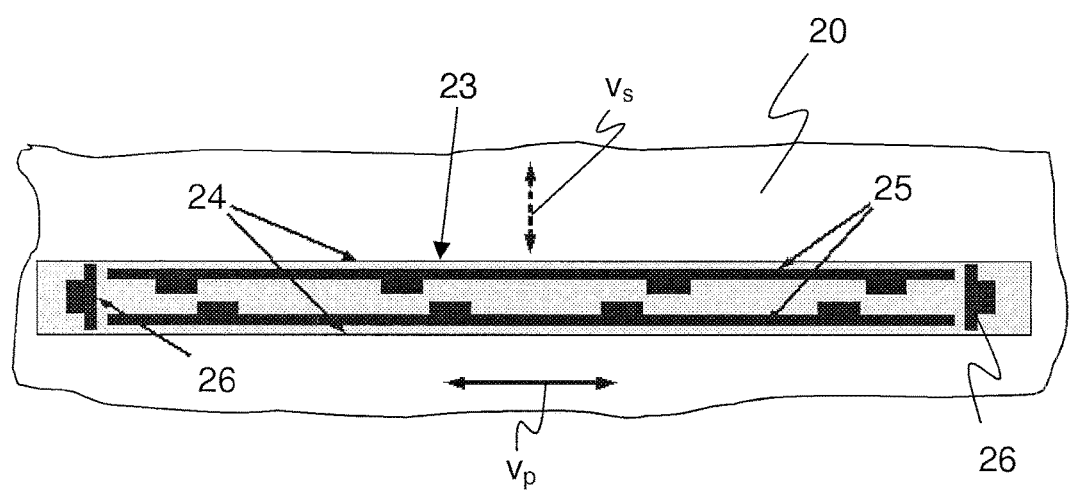
FIG. 2 a detection box.

FIG. 2 depicts an embodiment of a detection box 23. Each detection box 23 comprises inner walls implementing electrodes 24 of the moving sensor mass 20. The electrodes 24 face counter-electrodes 25 anchored to and insulated form the substrate, so that motions of the detection box 23 in the direction of the sensor motion perpendicular to the drive of the sample masses 1 lead to changes in capacitance that are measured. In order to avoid the influence of the radial primary motion of the sample mass 1 on the changing boundary fields to the right and left in the box 23, shielding electrodes 26 comprising the same potential as the displaced mass 20 can be used, thereby guaranteeing constant boundary fields.

The present invention is not limited to the example embodiments shown. It is possible, for example, to construct a 2D sensor according to the same principle, for example, having only two oscillating driven sample masses 1 and sensor masses 20 disposed therein for detecting a Z rotational rate. It is also not necessary that the sensor masses 20 are located within the sample masses 1. They can also fundamentally be disposed outside of the sample masses 1, wherein, however, the advantage of compact construction of the micro-gyroscope no longer applies.

The invention claimed is:

1. A gyroscope comprising:
   a substrate;
   a central anchor fixed on the substrate;
   a plurality of sample masses, the plurality of sample masses being disposed around the central anchor and driven radially relative to the central anchor;
   a first anchor spring positioned between the central anchor and a first sample mass from the plurality of sample masses, the first anchor spring configured to allow the first sample mass to be deflected radially in a first plane and out of the first plane;
   a second anchor spring positioned between the central anchor and a second sample mass from the plurality of sample masses, the second anchor spring configured to allow the second sample mass to be deflected radially in the first plane and out of the first plane;
   a plurality of drive elements coupled to the plurality of sample masses, the plurality of drive elements configured to cause the plurality of sample masses to generate Coriolis forces when the substrate is rotated; and
   a first sensor mass disposed on the first sample mass, the first sensor mass configured to deflect within a first deflection plane and orthogonal to a first radial drive direction of the first sensor mass.

2. The gyroscope of claim 1 further comprising a first sensor element disposed below the first sample mass, the first sensor element configured to detect deflections of the first sample mass due to Coriolis forces.

3. The gyroscope of claim 2 wherein the first sensor element is associated with the plurality of sensor masses for detecting a Z rotational rate.

4. The gyroscope of claim 3 wherein the first sensor element is implemented by a capacitance of the first sample mass and a first electrode disposed on the substrate.

5. The gyroscope of claim 3 further comprising a second sensor element disposed below a second sample mass from the plurality of sample masses, the second sensor element configured to detect deflections of the second sample mass due to the Coriolis forces.

6. The gyroscope of claim 5 wherein the first and second sensor elements are combined into a differential sensor configured to detect rotation of the substrate about a first axis in a X-Y plane that is perpendicular to a second axis connecting said two opposing sample masses.

7. The gyroscope of claim 1 wherein the first plane is an X-Y plane.

8. The gyroscope of claim 1 wherein the plurality of sample masses is uniformly distributed around the central anchor.

9. The gyroscope of claim 8 wherein the plurality of sample masses consists of four sample masses distributed uniformly about a circumference of the central anchor.

10. The gyroscope of claim 1 wherein the central anchor comprises an elastic gimbal mount that couples the central anchor to the plurality of sample masses.

11. The gyroscope of claim 10 wherein the elastic gimbal mount comprises two rings coupled together by torsion springs.

12. The gyroscope of claim 1 further comprising: a second sensor mass disposed on a second sample mass, the second sensor mass configured to deflect within a second deflection plane and orthogonal to a second radial drive direction of the second sensor mass; and a second sensor element disposed below the second sample mass, the second sensor element configured to detect deflections of the second sample mass due to the Coriolis forces.

13. The gyroscope of claim 12 further comprising at least one synchronization spring coupled between the first and second sample masses, the at least one synchronization spring configured to facilitate synchronized oscillations of the first and second sample masses.

14. The gyroscope of claim 1 wherein the plurality of drive elements comprises a plurality of electrodes.

15. A method for detecting a rate of rotation, the method comprising: driving a plurality of sample masses to radially oscillate relative to a central anchor on a substrate, the radial oscillation at least partially controlled by at least one anchor spring coupled between a first sample mass from the plurality of sample masses and the central anchor; deflecting the first sample mass from the plurality of sample masses, wherein the deflecting is allowed by the at least one anchor spring and occurs radially in a first plane and out of the first plane; sensing a first deflection of a first sensor mass disposed relative to the first sample mass, the first deflection the occurs within a first deflection plane and orthogonal to a first radial drive direction of the first sensor mass; and deriving a rate of rotation of the substrate about a first axis based on the first deflection.

16. The method of claim 15 wherein the derivation of the rate of rotation includes a capacitance change associated with the first deflection.

17. The method of claim 16 further comprising the steps of:
deflecting a second sample mass from the plurality of sample masses, the deflecting occurs radially in the first plane and out of the first plane; and
sensing a second deflection of a second sensor mass disposed relative to the second sample mass, the second deflection the occurs within the first deflection plane and orthogonal to a second radial drive direction of the second sensor mass.

18. The method of claim 17 further comprising the step of synchronizing radial oscillations of the first and second sample masses.

19. The method of claim 17 further comprising:
identifying a first capacitive change associated with the first deflection of the first sensor mass;
identifying a second capacitive change associate with the second deflection of the second sensor mass; and
calculating a differential value used to derive the rate of rotation.

* * * * *